(12) United States Patent
Hirota et al.

(10) Patent No.: US 9,598,125 B2
(45) Date of Patent: Mar. 21, 2017

(54) SEAL STRUCTURE OF CRAWLER-DRIVING APPARATUS

(71) Applicant: KAYABA INDUSTRY CO., LTD., Minato-ku, Tokyo (JP)

(72) Inventors: Yoshikazu Hirota, Kani (JP); Chikashi Imoto, Inuyama (JP); Kazumi Ito, Sagamihara (JP); Junichiro Sugimoto, Sagamihara (JP); Eishin Noguchi, Sagamihara (JP); Kaori Kawabata, Sagamihara (JP)

(73) Assignee: KYB Corporation, Tokyo (JP)

( * ) Notice: Subject to any disclaimer, the term of this patent is extended or adjusted under 35 U.S.C. 154(b) by 291 days.

(21) Appl. No.: 14/376,139

(22) PCT Filed: Mar. 28, 2013

(86) PCT No.: PCT/JP2013/059371
§ 371 (c)(1),
(2) Date: Aug. 1, 2014

(87) PCT Pub. No.: WO2013/147079
PCT Pub. Date: Oct. 3, 2013

(65) Prior Publication Data
US 2015/0298750 A1   Oct. 22, 2015

(30) Foreign Application Priority Data

Mar. 30, 2012 (JP) .................... 2012-080968
Mar. 30, 2012 (JP) .................... 2012-081547
Mar. 30, 2012 (JP) .................... 2012-081617

(51) Int. Cl.
*F16J 15/32* (2016.01)
*B62D 55/088* (2006.01)
(Continued)

(52) U.S. Cl.
CPC .......... *B62D 55/088* (2013.01); *F16J 15/008* (2013.01); *F16J 15/3204* (2013.01); *F16J 15/344* (2013.01); *F16J 15/3464* (2013.01)

(58) Field of Classification Search
CPC ........ F16J 15/34; F16J 15/3436; F16J 15/344; F16J 15/3472; F16J 15/3476
See application file for complete search history.

(56) References Cited

U.S. PATENT DOCUMENTS 2,590,759 A * 3/1952 Dale ................. F16J 15/344
                                                277/387
2,908,521 A * 10/1959 Kangas ............. F16J 15/3456
                                                277/386
(Continued)

FOREIGN PATENT DOCUMENTS

JP       4967061 U     6/1974
JP       5566881 U     5/1980
JP    2001248735 A     9/2001

OTHER PUBLICATIONS

International Search Report and Written Opinion mailed May 28, 2013, corresponding International Application No. PCT/JP2013/059371.

*Primary Examiner* — Vishal Patel
(74) *Attorney, Agent, or Firm* — Hauptman Ham, LLP

(57) ABSTRACT

A seal structure is provided to block a clearance between a rotational casing and a fixed housing for driving a crawler of a crawler vehicle. A seal ring is held in a first annular holding groove provided in the fixed housing together with a first O-ring that biases the seal ring toward the outside of the first holding groove. A second holding groove having an opening facing the first holding groove is provided in the rotational casing to hold a slide ring having a higher rigidity than that of the seal ring together with a second O-ring that biases the slide ring toward the seal ring. A foreign object such as mud (Continued)

is thereby prevented from invading a gear chamber without increasing a frictional loss.

9 Claims, 7 Drawing Sheets

(51) Int. Cl.
  *F16J 15/34* (2006.01)
  *F16J 15/00* (2006.01)

(56) References Cited

U.S. PATENT DOCUMENTS

| | | | | |
|---|---|---|---|---|
| 2,954,264 A * | 9/1960 | Tisch | ............... | F16J 15/32 277/630 |
| 2,983,533 A * | 5/1961 | Tisch | ............... | F16J 15/32 277/649 |
| 3,007,723 A * | 11/1961 | Clarke | ............... | F16J 15/56 277/311 |
| 3,272,519 A * | 9/1966 | Voitik | ............... | F16J 15/344 277/380 |
| 4,092,054 A * | 5/1978 | Dye | ............... | E21B 10/24 175/337 |
| 4,176,848 A * | 12/1979 | Lafuze | ............... | E21B 10/25 175/371 |
| 4,557,487 A * | 12/1985 | Banas | ............... | F16J 15/32 277/566 |
| 4,844,483 A * | 7/1989 | Iijima | ............... | F16J 15/162 277/382 |
| 5,080,183 A * | 1/1992 | Schumacher | ............... | E21B 10/24 175/228 |
| 5,577,739 A * | 11/1996 | Ciotola | ............... | F16J 15/3472 277/380 |
| 5,899,459 A * | 5/1999 | Watts | ............... | F16J 15/344 277/377 |
| 2002/0163133 A1* | 11/2002 | Bedford | ............... | F16J 15/344 277/309 |
| 2004/0173976 A1* | 9/2004 | Boggs | ............... | F16J 15/164 277/628 |
| 2011/0204574 A1* | 8/2011 | Grunaug | ............... | F16J 15/344 277/358 |

* cited by examiner

SEAL STRUCTURE OF CRAWLER-DRIVING APPARATUS

FIELD OF THE INVENTION

This invention relates to a seal structure that seals a crawler-driving device.

BACKGROUND OF THE INVENTION

In a crawler vehicle such as a power shovel, a crawler is driven using a sprocket fixed in an outer circumference of a rotational casing. Since the rotational casing is located in an outer side of a vehicle body, the rotational casing is rotated in a muddy state when the crawler vehicle travels on miry mud in a construction field.

In JP 2001-248735 A, published by The Japan Patent Office, proposes a seal structure for preventing a foreign object such as mud from invading a gap between such a rotational casing and a fixed housing fixed to the vehicle body. The seal structure has a labyrinth seal and a floating seal between the fixed housing and the rotational casing.

The labyrinth seal has a clearance having a cranked cross-sectional shape defined around the floating seal in order to prevent a foreign object such as mud from approaching the floating seal.

The floating seal has a pair of metal seal rings supported by an O-ring between the fixed housing and an inner wall surface of the rotational casing. The seal ring elastically supported by the O-ring installed in the fixed housing and the seal ring supported by the O-ring installed in the rotational casing make sliding contact with each other. As a result, lubricant inside the crawler-driving apparatus is sealed to prevent an external leakage, and a foreign object is prevented from invading the apparatus from the outside.

SUMMARY OF THE INVENTION

A load applied to the rotational housing varies as a crawler passes through an irregular ground surface. In this case, the rotational casing may be eccentric with respect to the fixed housing due to a reaction of a bearing that supports the rotational casing. As a result, a clearance between the rotational casing and the fixed housing varies depending on a rotational angular position of the rotation al casing. Accordingly, it may be difficult to prevent a foreign object such as mud from invading the apparatus using the floating seal.

The floating seal generates a high frictional heat in a sliding contact portion of the metal seal rings having a sliding contact with each other. Due to the frictional heat, lubricant or a seal material used within the crawler-driving apparatus may be overheated. As the frictional heat is generated, a frictional loss of the floating seal also increases.

It is therefore an object of this invention to improve a performance of a seal structure of a crawler-driving apparatus with respect to prevention of a foreign object such as mud from invading the crawler-driving apparatus as well as reduction of a frictional loss.

In order to achieve the above object, this invention provides a seal structure of a crawler-driving apparatus arranged between a rotational casing that drives a crawler of a crawler vehicle and a fixed housing fixed to a vehicle body of the crawler vehicle.

The seal structure comprises a first annular holding groove formed in one of the rotational casing and the fixed housing, a second annular holding groove formed in the other one of the rotational casing and the fixed housing to face the first holding groove, a seal ring held in the first holding groove, a slide ring that is held in the second holding groove and has a rigidity higher than that of the seal ring, a first elastic member that is held in the first holding groove to bias the seal ring to the slide ring, and a second elastic member that is held in the second holding groove to bias the slide ring to the seal ring.

The details as well as other features and advantages of this invention are set forth in the remainder of the specification and are shown in the accompanying drawings.

DESCRIPTION OF THE PREFERRED EMBODIMENTS

Figure 1:
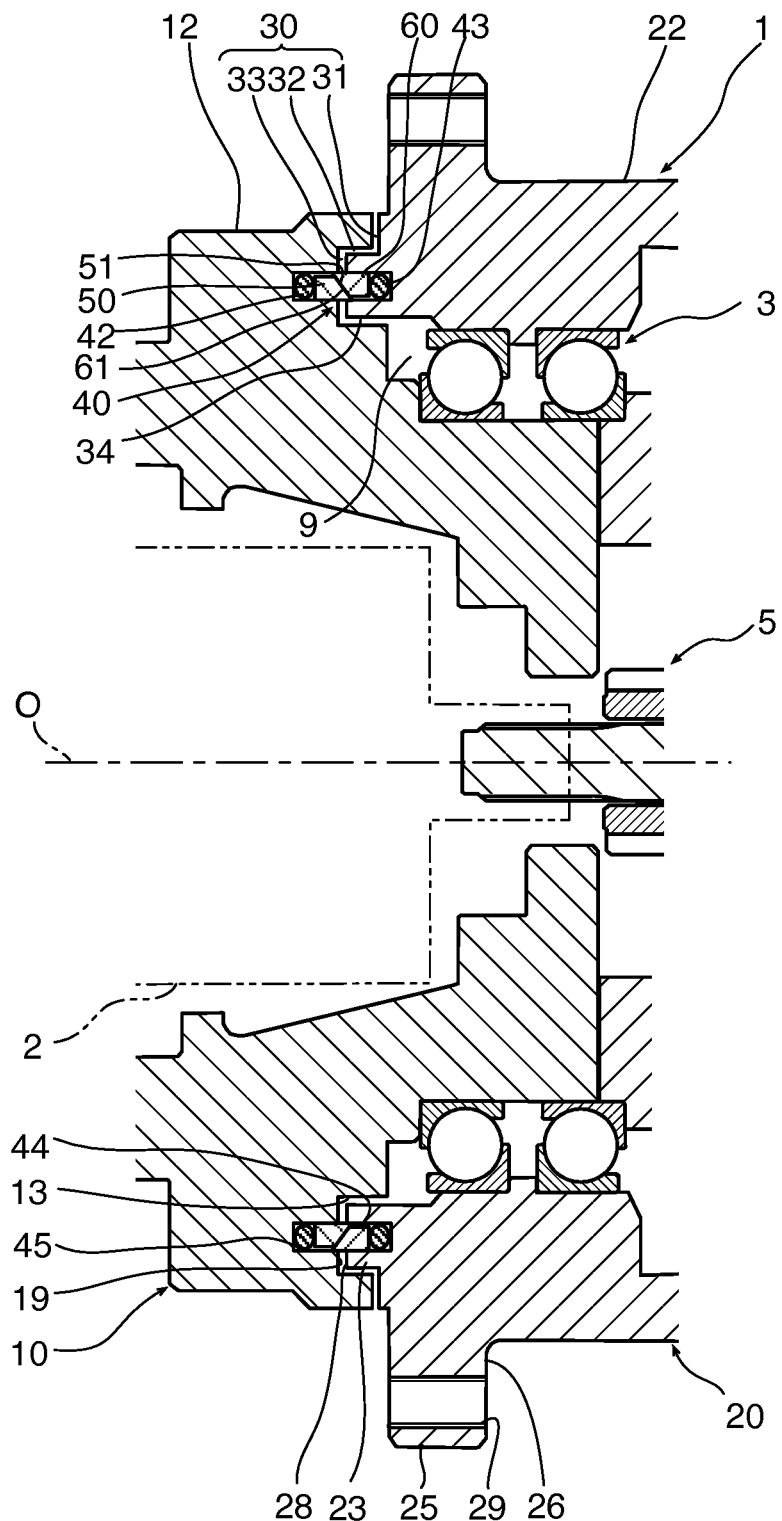
FIG. 1 is a longitudinal-sectional view of a crawler-driving apparatus according to a first embodiment of the invention taken along a plane including a rotation axis.

Referring to FIG. 1 of the drawings, a crawler-driving apparatus 1 installed in a crawler vehicle such as a hydraulic shovel comprises a fixed housing 10 fixed to a vehicle body of the crawler vehicle and a cylindrical rotational casing 20. A sprocket or a crawler wheel not shown is fixed to the outer circumference of the rotational casing 20. As the rotational casing 20 rotates, the sprocket drives a crawler thereby causing the crawler vehicle to travel.

The fixed housing 10 is fixed to a frame of the crawler vehicle. A hydraulic motor 2 is provided in the fixed housing 10. The hydraulic motor 2 is constituted, for example, by a swash plate type piston motor. The hydraulic motor 2 rotates with respect to a rotation axis O by supplying a hydraulic fluid thereto from a hydraulic source.

The rotational casing 20 is supported by the fixed housing 10 through a bearing 3 so as to be free to rotate. The rotational casing 20 rotates with respect to the rotation axis O.

The rotational casing 20 internally comprises a reduction gear set 5. The reduction gear set 5 reduces an output rotation of the hydraulic motor 2 and transmits to the rotational casing 20. The reduction gear set 5 is housed in the gear chamber 9 formed inside the rotational casing 20. A bearing 3 for supporting the rotational casing 20 to the fixed housing 10 so as to be free to rotate is also housed in the gear chamber 9.

The rotational casing 20 comprises an external wall portion 22 and an annular flange 25 protruding in a radial direction therefrom. The flange 25 has a rotational flange end face 26 extending in a radial direction perpendicularly to the rotation axis O. A plurality of screw holes 29 having openings in the rotational flange end face 26 are provided. The sprocket or the crawler wheel abuts on the rotational flange end face 26 and is fixed to the flange 25 using a bolt screwed to the screw hole 29, so that it rotates in synchronization with the rotational casing 20.

A labyrinth seal 30 is provided between the fixed housing 10 and the rotational casing 20. The labyrinth seal 30 is arranged between an annular concave portion formed in the fixed housing 10 and an annular convex portion 23 formed in the rotational casing 20. This arrangement preferably prevents a foreign object such as mud from invading the gear chamber 9 by deforming an intrusion path of a foreign object along a crank shape.

Figure 2:
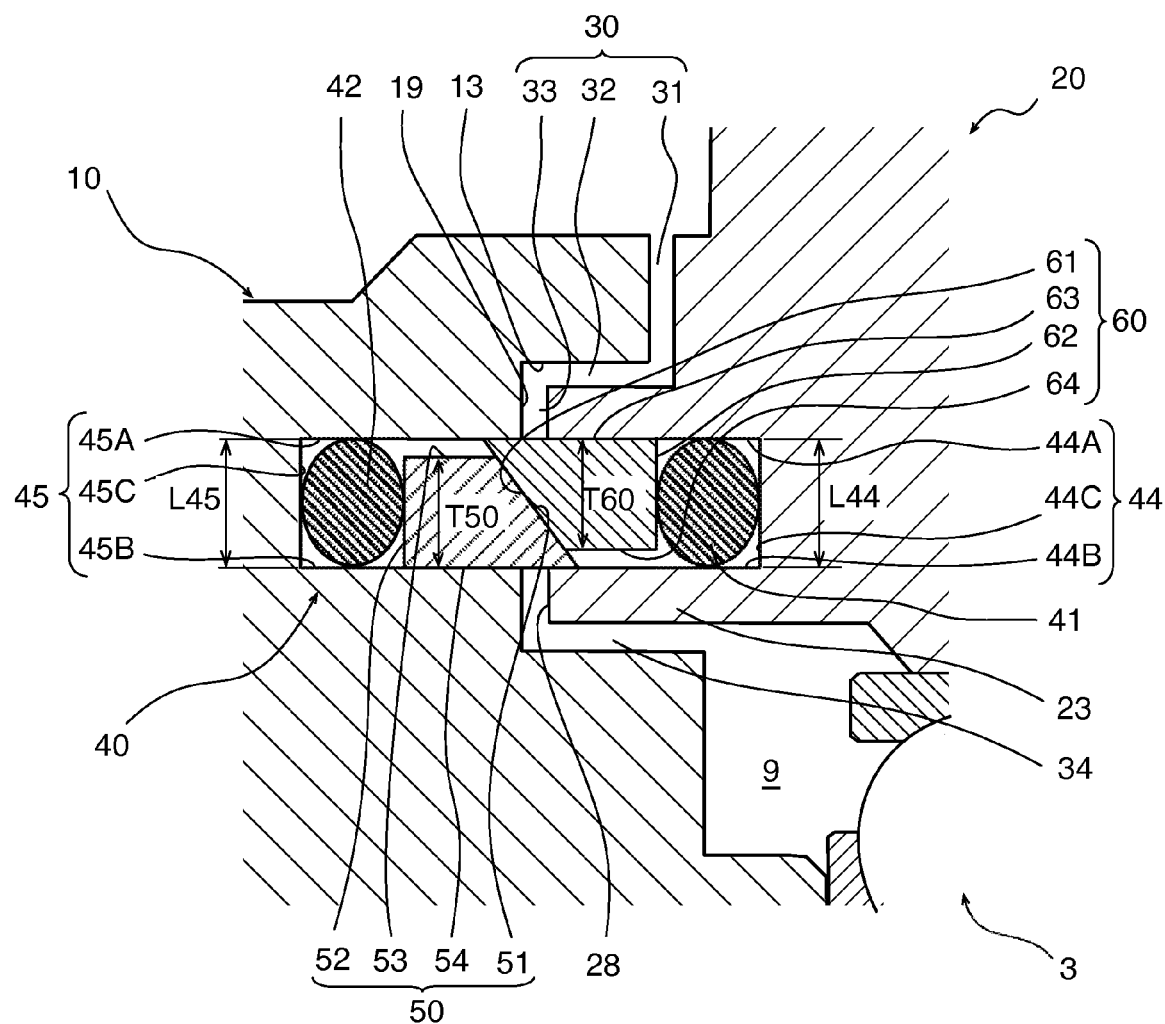
FIG. 2 is an enlarged view of essential parts of the crawler-driving apparatus shown in FIG. 1.

Referring to FIG. 2, an axial gap 31, a radial gap 32, an axial gap 33, and a radial gap 34 are formed between the fixed housing 10 and the rotational casing 20. The axial gaps 31 and 33 are gaps between the fixed housing 10 and the rotational casing 20 in the rotation axis O direction. The radial gaps 32 and 34 are radial gaps between the fixed housing 10 and the rotational casing 20.

The axial gap 31 has an outer end that opens across 360° in the outer circumference of the crawler-driving apparatus 1 and an inner end that communicates with an end of the radial gap 32. Another end of the radial gap 32 communicates with an end of the axial gap 33. Another end of the radial gap 33 communicates with an end of the radial gap 34. Another end of the radial gap 34 communicates with the gear chamber 9 in the vicinity of the bearing 3.

The axial gap 33 is formed between a bottom surface 19 of an annular concave portion 13 formed in the fixed housing 10 and an end face 28 of an annular convex portion 23 formed in the rotational casing 20.

The labyrinth seal 30 has a seal unit 40 that blocks the axial gap 33. In the fixed housing 10, a first holding groove 45 in an annular shape and having an opening in the annular concave portion 13 facing the annular convex portion 23 is formed coaxially with the rotation axis O. In the rotational casing 20, a second holding groove 44 having an opening in the annular convex portion 23 facing the first holding groove 45 is formed coaxially with the rotation axis O. The first and second holding grooves 45 and 44 are coaxial and have an identical diameter.

A seal ring 50 and a first O-ring 42 that biases the seal ring 50 in a protruding direction from the first holding groove 45 towards the second holding groove 44 are held in the first holding groove 45. A slide ring 60 and a second O-ring 41 that biases the slide ring 60 in a protruding direction from the second holding groove 44 towards the first holding groove 45 are held in the second holding groove 44.

The first holding groove 45 has groove side surfaces 45A and 45B extending in the direction of the rotation axis O and a groove bottom surface 45C extending in a radial direction perpendicularly to the rotation axis O.

The radial opening width L45 of the first holding groove 45 corresponds to a radial distance between the groove side surfaces 45A and 45B. The radial opening width L45 of the first holding groove 45 is set to be larger than a radial thickness T50 of the seal ring 50.

The second holding groove 44 has a groove side surfaces 44A and 44B extending in the direction of the rotation axis O and a groove bottom surface 44C extending in a radial direction perpendicularly to the rotation axis O.

A radial opening width L44 of the second holding groove 44 corresponds to a radial distance between the groove side surfaces 44A and 44B. A radial opening width L44 of the second holding groove 44 is set to be larger than a radial thickness T60 of the slide ring 60.

It is noted that the radial thickness T50 of the seal ring 50 is set to be equal to the radial thickness T60 of the slide ring 60, and the radial-direction opening width L44 of the second holding groove 44 is set to be equal to the radial opening width L45 of the first holding groove 45.

According to the configuration described above, the first holding groove r44 and the second holding groove 45 face each other by interposing the radial gap 33, and a consecutive space is formed across the fixed housing 10 and rotational casing 20. A cross section of the space cut along a plane including the rotation axis O is rectangular as illustrated in the drawings.

The thickness T60 of the slide ring 60 and the radial thickness T50 of the seal ring 50 are set to be equal to each other.

The slide ring 60 has a slide surface 61 facing the seal ring 50, a ring end face 62 parallel to the groove bottom surface 44C of the second holding groove 44, an outer circumferential surface 63 in contact with the groove side surface 44A of the second holding groove 44 and the groove side surface 45A of the first holding groove 45, and an inner circumferential surface 64 facing the groove side surface 44B of the second holding groove 44. An outer diameter of the slide ring 60, that is, a diameter of the outer circumferential surface 63 is formed to be larger than an outer diameter of the seal ring 50, that is, a diameter of the outer circumferential surface 53. The slide surface 61 is formed on a conical surface inclined with respect to the rotation axis O such that a dimension of the outer circumferential surface 63 in the direction of the rotation axis O is longer than a dimension of the inner circumferential surface 64 in the same direction. A gap is formed between the inner circumferential surface 64 and the groove side surface 44B of the second holding groove 44.

As illustrated in the drawings, the slide ring 60 is arranged such that the outer circumferential surface 63 comes in contact with the groove side surface 44A of the second holding groove 44 and the groove side surface 45A of the first holding groove 45 across the entire periphery, and the inner circumferential surface 64 faces the groove side surface 44B of the second holding groove 44 with a slight gap. The slight gap is provided between the inner circumferential surface 64 and the groove side surface 44B in order to facilitate arrangement of the slide ring 60 or the second O-ring 41 in the second holding groove 44.

The seal ring 50 has a sealing portion 51 facing the slide surface 61, a ring end face 52 parallel to the groove bottom surface 45c of the first holding groove 45, an outer circumferential surface 53 facing the groove side surface 45A of the first holding groove 45, and an inner circumferential surface 54 in contact with the groove side surface 45B of the first holding groove 45 and the groove side surface 44B of the second holding groove 44. The sealing portion 51 makes sliding contact with the slide surface 61 and is formed on a conical surface inclined with respect to the rotation axis O such that a dimension of the outer circumferential surface 53 in the direction of the rotation axis O is shorter than a dimension of the inner circumferential surface 54 in the same direction.

As shown in the figure, the seal ring 50 is formed such that the inner circumferential surface 54 comes in contact with the groove side surface 45B of the first holding groove 45 and the groove side surface 44B of the second holding groove 44 across the entire periphery, and the outer circumferential surface 53 faces the groove side surface 45A of the first holding groove 45 with a slight gap. The slight gap between the outer circumferential surface 53 and the groove side surface 45A is provided in order to facilitate arrangement of the seal ring 50 or the first O-ring 42 in the first holding groove 45.

The seal ring 50 is formed of a resin material such as a polytetrafluoroethylene (PTFE) resin. The seal ring 50 may be formed of other low-frictional resin materials. Meanwhile, the slide ring 60 is formed of a metal and has a higher rigidity than that of the seal ring 50. The seal ring 60 may be formed of a resin material such as polyamide.

The seal ring 50 is formed in a ring shape having no discontinuous portion and is arranged across the first and second holding grooves 45 and 44. Both cross sections obtained by cutting the first and second holding grooves 45 and 44 along a plane perpendicular to the rotation axis O have a ring shape. Therefore, the seal ring 50 having the same ring-shaped cross sections can be held in the first and second holding grooves 45 and 44 across the entire periphery, and it is not necessary to form a cut portion in the seal ring 50 for fitting.

The first O-ring 42 serves as a first elastic member that biases the seal ring 50 so as to protrude to the inside of the second holding groove 44 from the first holding groove 45. The first O-ring 42 is a ring-shaped rubber member having a circular or elliptical cross section in an unloaded condition. The first O-ring 42 is arranged in a compressed state between the groove bottom surface 45C of the first holding groove 45 and the seal ring 50 to press the ring end face 52 of the seal ring 50.

The slide ring 60 is formed in a ring shape having no cut portion and is arranged across the first and second holding grooves 45 and 44. Both cross sections obtained by cutting the first and second holding grooves 45 and 44 along a plane perpendicular to the rotation axis O have a ring shape. Therefore, the slide ring 60 having the same ring-shaped cross section can be held in the first and second holding grooves 45 and 44 across the entire periphery, and it is not necessary to form a cut portion in the slide ring 60 for fitting.

The second O-ring 41 serves as a second elastic member that biases the slide ring 60 so as to protrude to the second holding groove 45 from the second holding groove 44. The second O-ring 41 is a ring-shaped rubber member having a circular or elliptical cross section in an unloaded condition. The second O-ring 41 is arranged in a compressed state between the groove bottom surface 44C of the second holding groove 44 and the slide ring 60 to press the ring end face 62 of the slide ring 60.

In the labyrinth seal 30 configured as described above, the slide ring 60 receives an outward load in a radial direction, that is, an upward load in FIG. 2, by virtue of the load applied to the slide surface 61 from the seal ring 50. As a result, the outer circumferential surface 63 is pressed to the groove side surface 44A of the second holding groove 44 and the groove side surface 45A of the first holding groove 45. A gap is formed between the inner circumferential surface 64 and the groove side surface 44B of the second holding groove 44.

Meanwhile, the seal ring 50 receives an inward load in a radial direction, that is, a downward load in FIG. 2, by virtue of a load applied to the sealing portion 51 from the slide ring 60. As a result, the inner circumferential surface 54 is pressed to the groove side surface 45B of the first holding groove 45 and the groove side surface 44B of the second holding groove 44. A gap is formed between the outer circumferential surface 53 and the groove side surface 45A of the first holding groove 45.

Herein, a pressing force from the seal ring 50 to the slide ring 60 depends on an elastic restoring force of the first ring 42 and the second O-ring 41 and an elastic restoring force of the seal ring 50 of itself. By setting a material and a shape in this manner, it is possible to suppress a frictional force generated between the seal ring 50 and the slide surface 61.

It is noted that a lip portion bulged in an annular shape against the slide surface 61 may be formed in the sealing portion 51.

If the seal ring 50 is formed of a low-frictional resin material, a frictional coefficient of the seal ring 50 against the slide surface 61 made of a metal is suppressed, compared to the frictional coefficient caused by the sliding contact between metals in the floating seal of the prior art.

The seal ring 50 may be made of a resin, and the slide ring 60 may preferably be formed of a low-frictional resin material having a lower frictional coefficient than that of the seal ring 50. As a result, the frictional coefficient of the seal ring 50 can further be suppressed.

Operations of the crawler-driving apparatus 1 will now be described.

When the crawler vehicle travels, in the crawler-driving apparatus 1, the hydraulic motor 2 drives the rotational casing 20 to rotate, and a sprocket rotating in synchronization with the rotational casing 20 rotates the crawler. For example, when the crawler vehicle travels on miry mud in a construction field or the like, the crawler is rotated in mud, and the crawler-driving apparatus 1 is also operated in mud.

In this state, in the crawler-driving apparatus 1, the seal ring 50 and the slide ring 60 blocks the axial gap 33 of the labyrinth seal 30. Therefore, it is possible to suppress intrusion of a foreign object such as mud and exposure of the lubricant of the gear chamber 9 to the outside.

Since the second holding groove 44 has an opening in the end face 28 of the annular convex portion 23, the radial gap 32 of the labyrinth seal 30 is formed to surround the second O-ring 41 and the slide ring 60 in the annular convex portion 23. Since the labyrinth seal 30 arranged along the arrangement space of the seal unit 40 has a sufficient length, it is possible to obtain an environment capable of preventing a foreign object such as mud from reaching the seal unit 40. In addition, since the radial gap 32 is provided, it is possible to suppress an increase in the sizes of the fixed housing 10 and the rotational casing 20.

When the crawler-driving apparatus 1 is used in a muddy environment where earth, sand, muddy water, and the like exist in the form of a mixture, the mixture adhered to an outer wall 12 of the fixed housing 10 and the rotational casing 20 may be pushed into the labyrinth seal 30.

Since the slide ring 60 makes contact with the groove side surface 45A of the first holding groove 45 and the groove side surface 44A of the second holding groove 44, the axial gap 33 of the labyrinth seal 30 is blocked even when a foreign object such as mud pushed into the labyrinth seal 30 invades the axial gap 33. It is therefore possible to effectively prevent a foreign object from invading the gear chamber 9. Since the slide ring 60 has a higher rigidity than that of the seal ring 50, the slide ring 60 is resistant to a deformation or a damage caused by a foreign object invading the labyrinth seal 30.

Meanwhile, the sealing portion 51 of the seal ring 50 makes sliding contact with the slide surface 61 by virtue of the elastic restoring forces of the first O-ring 42 and the second O-ring 41. This sliding contact portion allows the gear chamber 9 between the rotational casing 20 and the fixed housing 10 to maintain a sealed condition. This sliding contact portion suppresses a leakage of the lubricant of the gear chamber 9 to the outside.

Since the seal ring 50 exists across the first and second holding grooves 45 and 44, and the inner circumferential surface 54 of the seal ring 50 is in contact with the groove side surface 45B of the first holding groove 45 and the groove side surface 45B of the second holding groove 44, the axial gap 33 is blocked. This blocked portion suppresses the leakage of the lubricant of the gear chamber 9 to the outside over the seal unit 40.

Next, a case will be considered where the rotational casing 20 becomes eccentric with respect to the fixed housing 10 due to a slackness in the bearing 3 while the crawler-driving apparatus 1 operates. In this case, a width of the axial gap 33, that is, a distance in the direction of the rotation axis O between the bottom surface 19 of the annular concave portion 13 and the end face 28 of the annular convex portion 23, changes, for example, by several millimeters depending on the rotational position of the rotational casing 20. As the rotational casing 20 is eccentric with respect to the fixed housing 10, the seal ring 50 pushed by the elastic restoring force of the first O-ring 42 moves in the direction of the rotation axis O along the groove side surface 45B of the first holding groove 45. In addition, the slide ring 60 pushed by the elastic restoring force of the second O-ring 41 moves in the direction of the rotation axis O along the groove side surface 44A of the second holding groove 44. As a result of this movement, the sealing portion 51 of the seal ring 50 maintains a sliding contact with the slide surface 61 of the slide ring 60. Therefore, it is possible to prevent a foreign object such as mud from invading the gear chamber 9 and the lubricant of the gear chamber 9 from leaking to the outside.

Even when a foreign object such as mud that has entered the labyrinth seal 30 and blocked by the seal ring 50 invades the first holding groove 45 through a clearance between the groove side surface 45A of the first holding groove 45 and the seal ring 50, such a foreign object is bound inside the first holding groove 45 under the elastic restoring force of the first O-ring 42. Therefore, a foreign object does not invade the gear chamber 9. Further, the foreign object entering the inside of the first holding groove 45 causes the slide surface 61 of the slide ring 60 to further press the sealing portion 51 of the seal ring 50. Therefore, it is possible to improve sealing performance between the seal ring 50 and the slide ring 60.

This embodiment has the following effects (1) to (4).

(1) The crawler-driving apparatus 1 according to this embodiment is arranged between the rotational casing 20 that drives the crawler of the crawler vehicle and the fixed housing 10 fixed to the vehicle body of the same. The crawler-driving apparatus 1 comprises the first holding groove 45 in the annular shape formed in the fixed housing 10. The first holding groove 45 has the opening facing the rotational casing 20. The seal ring 50 and the first O-ring 42 as the first elastic member to bias the seal ring 50 toward rotational casing 20 are held in the first holding groove 45. The second holding groove 44 in the annular shape is formed in the rotational casing 20. The second holding groove 44 has the opening facing the first holding groove 45. The slide ring 60 held in the second holding groove 44 with a higher rigidity than that of the seal ring 50, and a second O-ring 41 as a second elastic member that biases the slide ring 60 toward the seal ring 50.

Therefore, even when the rotational casing 20 becomes eccentric with respect to the fixed housing 10 due to a slackness in the bearing 3 or the like, it is possible to maintain a sliding contact between the seal ring 50 pushed by the elastic restoring force of the first O-ring 42 and the slide ring 60 pushed by elastic restoring force of the second O-ring 41 to prevent separation, block the axial gap 33 between the rotational casing 20 and the fixed housing 10, and prevent a foreign object such as mud from invading the gear chamber 9.

The seal ring 50 is held in the first holding groove 45 and makes sliding contact with the slide ring 60 having a higher rigidity than the seal ring 50. As a result, it is possible to suppress a rigidity required to the seal ring 50 and a low-frictional resin material can be used for the seal ring 50. Further, since the materials and the shapes of the first O-ring 42 and the second O-ring 4 can be set arbitrarily, it is possible to fulfill the requirement with respect to the pressing force of the seal ring 50 against the slide ring 60. As a result, it is possible to reduce a frictional loss generated in the sliding contact portion between the seal ring 50 and the slide ring 60, thereby decreasing a fuel consumption of the crawler vehicle. Still further, it is possible to prevent the lubricant or the seal material in the crawler-driving apparatus 1 from becoming overheated by the frictional heat, thereby increasing the durability of the component members.

A configuration of the crawler-driving apparatus 1 is not limited to those described above. The first holding groove 45 that holds the seal ring 50 may be formed in the rotational casing 20, and the second holding groove 44 that holds the slide ring 60 may be formed in the fixed housing 10. In this case, the slide ring 60 is not rotated, and the seal ring 50 is rotated in synchronization with the rotational casing 20.

(2) The first holding groove 45 has groove side surfaces 45A and 45B extending in the direction of the rotation axis O of the rotational casing 20, and the second holding groove 44 has groove side surfaces 44A and 44B extending in the direction of the rotation axis O of the rotational casing 20. As the rotational casing 20 becomes eccentric with respect to the rotation axis O due to a slackness in the bearing 3, the slide ring 60 moves in the direction of the rotation axis O while the slide ring 60 maintains sliding contact with the groove side surface 44A of the second holding groove 44. In addition, the seal ring 50 moves in the direction of the rotation axis O while the seal ring 50 maintains sliding contact with the groove side surface 45B of the first holding groove 45. Therefore, the sealing portion 51 of the seal ring 50 maintains a sliding contact state to prevent separation from the slide surface 61 of the slide ring 60. Even when the rotational casing 20 becomes eccentric, it is possible to maintain a blocked state of the axial gap 33 between the rotational casing 20 and the fixed housing 10.

A configuration of the crawler-driving apparatus 1 is not limited to those described above. Instead of the seal unit 40, a seal unit that seals the radial gap 34 extending along the rotation axis O may be provided. In this case, the first and second holding grooves of the seal unit have radial groove side surfaces perpendicular to the rotation axis O.

(3) The slide ring 60 has the conical slide surface 61 inclined with respect to the rotation axis O of the rotational casing 20, and the seal ring 50 has the conical sealing portion 51 that makes sliding contact with the slide surface 61. Since the sealing portion 51 of the seal ring 50 makes sliding contact with the conical slide surface 61, it is possible to obtain a centering effect by which the seal ring 50 is promoted to be concentric with the slide ring 60 and more perfectly maintain a blocked state of the axial gap 33 between the rotational casing 20 and the fixed housing 10.

(4) The slide ring 60 abuts on the outer-circumferential groove side surface 45A of the first holding groove 45 and the outer-circumferential groove side surface 44A of the second holding groove 44. As a result, the slide ring 60 having a relatively high rigidity blocks the axial gap 33 in a blocking position of the outer circumference side with respect to the rotation axis O to prevent intrusion of a foreign object such as mud. The seal ring 50 abuts on the inner-circumferential groove side surface 44B of the first holding groove 44 and the inner-circumferential groove side surface 45B of the second holding groove 45. As a result, the seal ring 50 having a relatively low rigidity blocks the axial gap 33 in a blocking position of the inner circumference side with respect to the rotation axis O to prevent a leakage of the lubricant of the gear chamber 9 to the outside. In this manner, it is possible to effectively prevent intrusion of a foreign object and a leakage of the lubricant in different positions.

Figure 3:
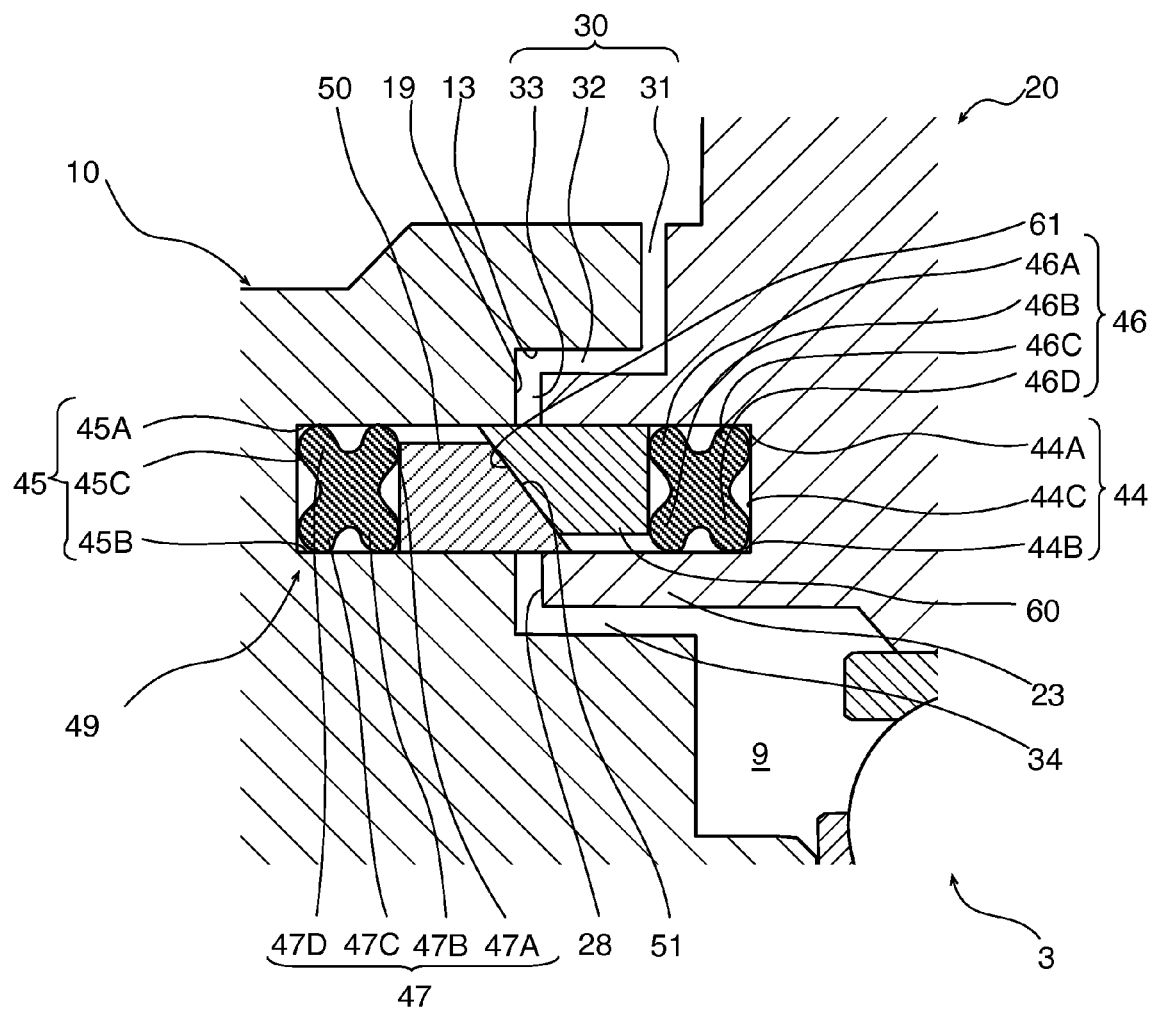
FIG. 3 is similar to FIG. 2 but showing a second embodiment of the invention.

Referring to FIG. 3, a second embodiment of this invention will be described. In this embodiment, a first X-ring 47 is provided as the first elastic member, and a second X-ring 46 is provided as the second elastic member. The other configurations are similar to those of the first embodiment. With respect to the components of this embodiment having the same construction as those of the first embodiment are given identical component numbers, and their description is herein omitted.

The first X-ring 47 has an X-shaped cross section including four convex portions 47A to 47D and is formed of rubber in a ring shape. The first X-ring 47 is located in a compressed state in the first holding groove 45 in rear of the seal ring 50 with respect to the sealing portion 51. The first X-ring 47 pushes the ring end face 52 of the seal ring 50 shown in FIG. 2 by virtue of the elastic restoring force to cause the seal ring 50 to press the slide ring 60.

In the first holding groove 45, a holding space for the first X-ring 47 is defined by the groove side surface 45A of the first holding groove 45, the groove bottom surface 45C, the groove side surface 45B of the first holding groove 45, and the ring end face 52 of the seal ring 50. A cross section of the holding space includes four corner portions. The convex portions 47A to 47D of the first X-ring 47 abut on the four corner portions. As the force applied from the seal ring 50 to the first X-ring 47 increases, the corner portions press the convex portions 47A to 47D of the first X-ring 47.

By virtue of the elastic restoring force of the first X-ring 47 deformed in this manner, the seal ring 50 is pressed to the slide ring 60. If the pressing force from the seal ring 50 to the slide ring 60 increases, the seal ring 50 is also strongly pressed to the groove side surface 45B of the first holding groove 45 and the groove side surface 44B of the second holding groove 44 by virtue of a reaction force applied from the slide surface 61 of the slide ring 60 inclined with respect to the rotation axis O. As a result, it is possible to improve a leak prevention capability of the seal ring 50 for the hydraulic fluid leaking from the gear chamber 9 to the axial gap 33.

The second X-ring 46 has an X-shaped cross section including four convex portions 46A to 46D and is formed of rubber in a ring shape. The second X-ring 46 is located in a compressed state in the second holding groove 44 in rear of the slide ring 60 with respect to the slide surface 61. The second X-ring 46 presses the ring end face 62 of the slide ring 60 shown in FIG. 2 by virtue of the elastic restoring force to cause the slide ring 60 to press the seal ring 50.

For the second X-ring 46, the second holding groove 44 have four annular corner portions defined by the groove side surface 44A of the second holding groove 44, the groove bottom surface 44C, the groove side surface 44B, and the ring end face 62 of the slide ring 60. The cross section of the holding space has four corner portions. The convex portions 46A to 46D of the second X-ring 46 abut on the four corner portions. As the force applied from the slide ring 60 to the second X-ring 46 increases, the convex portions 46A to 46D of the second X-ring 46 are pressed to the corner portions.

The slide ring 60 is strongly pressed to the seal ring by virtue of the elastic restoring force of the second X-ring 46 deformed in this manner. As the pressing force from the slide ring 60 to the seal ring 50 increases, the slide ring 60 is also strongly pressed to the groove side surface 45A of the first holding groove 45 and the groove side surface 44A of the second holding groove 44 by virtue of the reaction force from the sealing portion 51 of the seal ring 50 inclined with respect to the rotation axis O. As a result, it is possible to improve an intrusion prevention capability of the slide ring 60 for a foreign object such as mud from axial gap 33 to the gear chamber 9.

According to the second embodiment described above, it is possible to obtain the effects similar to those of the first embodiment. Furthermore, according to the second embodiment, it is possible to obtain the following effect (5).

(5) Using the first and second X-rings 47 and 46 having an X-shaped cross section as the first and second elastic members, respectively, it is possible to increase the pressing force of the seal ring 50 to the groove side surface 45B of the first holding groove 45 and the groove side surface 44B of the second holding groove 44 by virtue of the elastic restoring forces of the first and second X-rings 47 and 46. In addition, it is possible to increase the pressing force of the slide ring 60 to the groove side surface 45A of the first holding groove 45 and the groove side surface 44A of the second holding groove 44. Therefore, it is possible to improve a leak prevention capability of the seal ring 50 for a hydraulic fluid from the gear chamber 9 to the axial gap 33 and an intrusion prevention capability of the slide ring 60 for preventing a foreign object such as mud from invading the gear chamber 9 from the axial gap 33.

According to the first and second embodiments described above, the first and second elastic members have similar configurations. However, for example, an O-ring may be employed as the first elastic member, and an X-ring may be employed as the second elastic member. Alternatively, the opposite configuration may also be possible.

Figure 4:
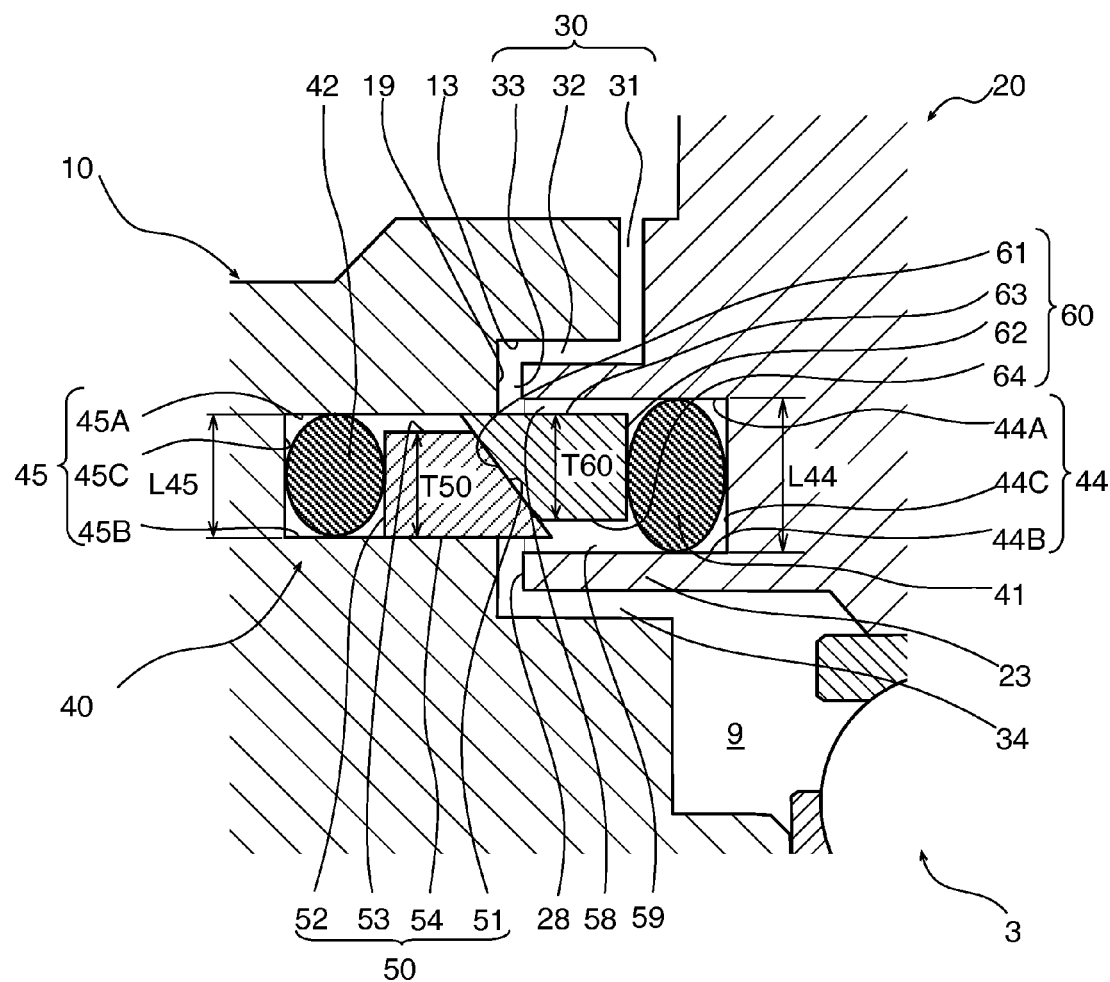
FIG. 4 is similar to FIG. 2 but showing a third embodiment of the invention.

Referring to FIG. 4, a third embodiment of the invention will be described.

In the first and second embodiment, the radial opening width L45 of the first holding groove 45 and the radial opening width L44 of the second holding groove 44 are formed in the same dimension. In the crawler-driving apparatus 1 according to the third embodiment, the radial opening width L44 of the second holding groove 44 is set to be larger than the radial opening width L45 of the first holding groove 45.

A radial thickness T60 of the slide ring 60 is set to be equal to a radial thickness T50 of the seal ring 50. The radial opening width L45 of the first holding groove 45 is set to have a slight clearance with respect to the radial thickness T50 of the seal ring 50. The radial opening width L44 of the second holding groove 44 is set to have a clearance in both inner and outer circumference sides with respect to the radial thickness T60 of the slide ring 60.

According to this embodiment also, an outer diameter of the slide ring 60, that is, a diameter of the outer circumferential surface 63 is formed to be larger than the outer diameter of the seal ring 50, that is, the diameter of the outer circumferential surface 53.

Since radial opening width L44 of the second holding groove 44 is larger than the radial opening width L45 of the first holding groove 45, a slide gap 58 having an annular cross section is formed between the slide ring 60 and the groove side surface 44A of the second holding groove 44. In addition, a slide gap 59 having an annular cross section is formed between the slide ring 60 and the groove side surface 44B of the second holding groove 44.

The first holding groove 45 is formed concentrically with the second holding groove 44 with respect to the rotation axis O. The second O-ring 41 held in the second holding groove 44 has a larger dimension at least in the radial direction, compared to the first O-ring 42 held in the first holding groove 45.

The other configurations of the seal structure according to this embodiment are similar to those of the first embodiment.

According to this embodiment, it is possible to obtain the following effects in addition to those of the first embodiment.

Specifically, due to the slide gaps 58 and 59 provided inside the second holding groove 44, it is possible to obtain a centering effect in the radial direction for maintaining the slide ring 60 concentrically with the seal ring 50.

Figure 5:
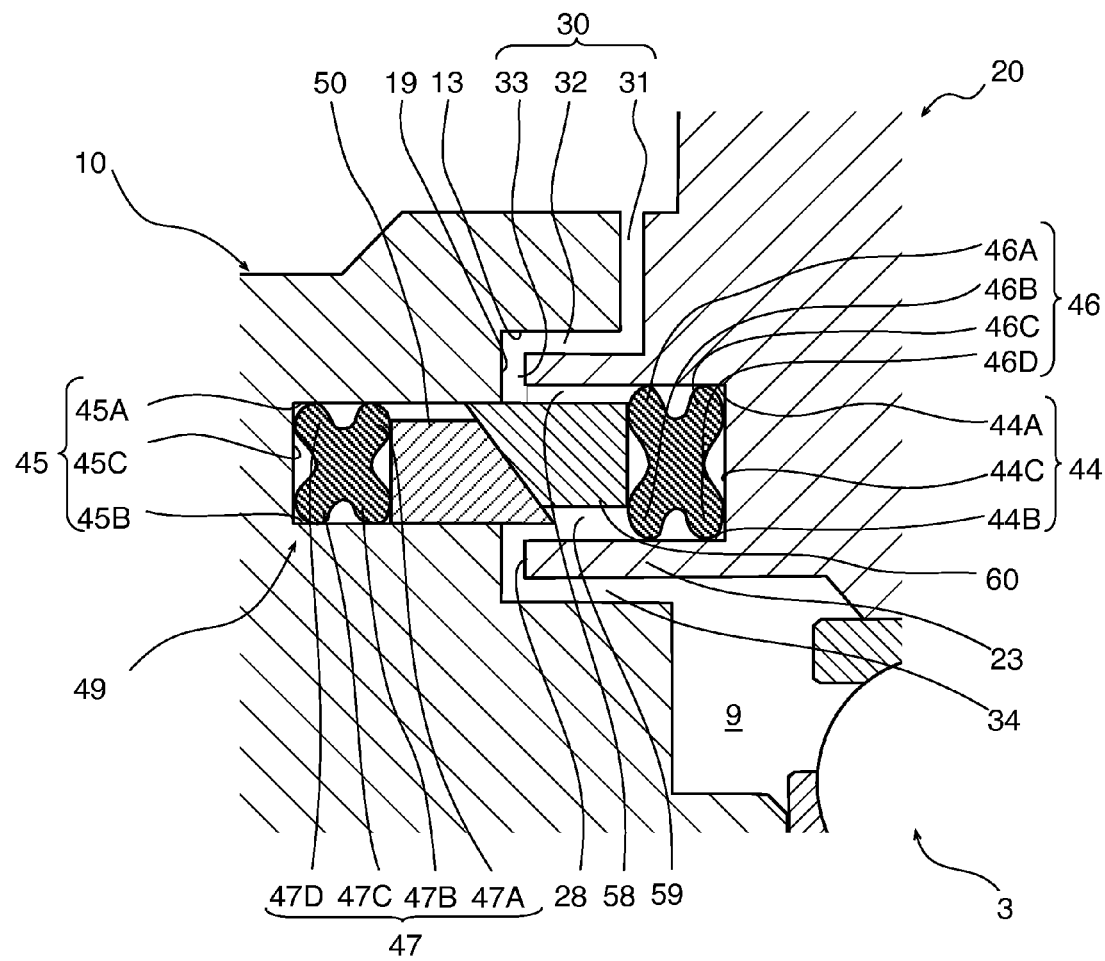
FIG. 5 is similar to FIG. 2 but showing a fourth embodiment of the invention.

Referring to FIG. 5, a fourth embodiment of the invention will be described.

According to the fourth embodiment, the first X-ring 47 of the second embodiment is employed instead of the first O-ring 42, and the second X-ring 46 of the second embodiment is employed instead of the second O-ring 41, compared to the third embodiment. The other configurations are similar to those of the third embodiment.

According to this embodiment, it is possible to obtain the effect of the second embodiment described in the effect (5) in addition to the effect of the third embodiment.

Figure 6:
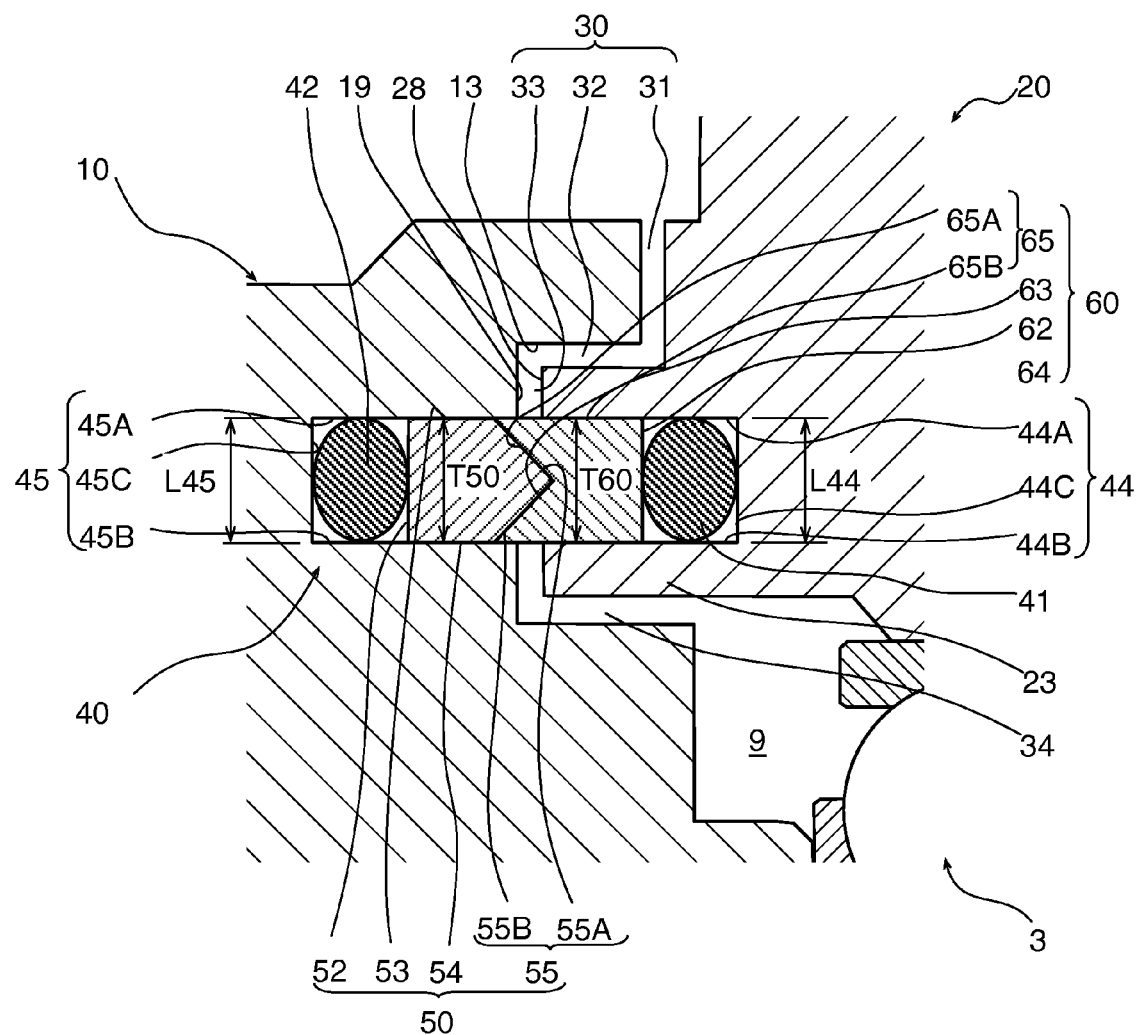
FIG. 6 is similar to FIG. 2 but showing a fifth embodiment of the invention.

Referring to FIG. 6, a fifth embodiment of the invention will be described.

The fifth embodiment is different from the first embodiment as described below.

According to this embodiment, the radial opening width L45 of the first holding groove 45 is set to be approximately equal to the radial thickness T50 of the seal ring 50 while a minimum engagement clearance is obtained for allowing the seal ring 50 to slide along the rotation axis O inside the first holding groove 45.

The radial opening width L44 of the second holding groove 44 corresponds to a radial distance between the groove side surfaces 44A and 44B. The radial opening width L45 of the second holding groove 44 is set to be approximately equal to the radial thickness T60 while a minimum engagement clearance is obtained for allowing the slide ring 60 to slide along the rotation axis O inside the second holding groove 44. It is noted that the radial thickness T50 of the seal ring 50 is equal to the radial thickness T60 of the slide ring 60, and the radial opening width L45 of the first holding groove 45 is set to be equal to the radial opening with L44 of the second holding groove 44.

This embodiment is different from the first embodiment in the shapes of the seal ring 50 and the slide ring 60.

According to this embodiment, the seal ring 50 has a guide protrusion 55 having an isosceles-triangular cross section protruding to the slide ring 60. The slide ring 60 has a guide trench 65 having an isosceles-triangular cross section that matches the guide protrusion 55.

The guide trench 65 has first and second sliding contact portions 65A and 65B having a conical shape. The guide protrusion 55 has first and second conical surfaces 55A and 55B.

According to this embodiment, the crawler-driving apparatus 1 is driven while the guide protrusion 55 having an isosceles-triangular cross section is fitted to the guide trench 65 having an isosceles-triangular cross section, that is, while the first conical surface 55A makes sliding contact with the first sliding contact portion 65A, and the second conical surface 55B makes sliding contact with the second sliding contact portion 65B.

When the crawler-driving apparatus 1 operates, the rotational casing 20 may become eccentric with respect to the fixed housing 10 due to a slackness of the bearing 3e, so that the gap width of the axial gap 33 changes by several millimeters depending on a rotation angle. Herein, the gap width of the axial gap 33 refers to a distance between the bottom surface 19 of the annular concave portion 13 and the end face 28 of the annular convex portion 23 in the direction of the rotation axis O. When the rotational casing 20 is eccentric with respect to the fixed housing 10, the seal ring 50 pressed by the elastic restoring force of the first O-ring 42 moves in the direction of the rotation axis O. The slide ring 60 pressed by the elastic restoring force of the second O-ring 41 moves in the direction of the rotation axis O along the groove side surfaces 45A and 45B of the first holding groove 45 and the groove side surfaces 44A and 44B of the second holding groove 44. In this manner, the guide protrusion 55 of the seal ring 50 follows a displacement of the guide trench 65 of the slide ring 60 without being separated.

When the rotational casing 20 rotates while it is eccentric with respect to the fixed housing 10, the rotation axis O of the rotational casing 20 is slightly inclined with respect to the center axis of the fixed housing 10. Even in this state, the slide ring 60 pressed by the second O-ring 41 maintains a sliding contact condition between the guide trench 65 and the guide protrusion 55 of the seal ring 50. Maintaining the sliding contact condition between the guide trench 65 and the guide protrusion 55 gives a centering effect on the slide ring 60 and the seal ring 50 so as to relatively rotate in a concentric position. As a result, since the sliding contact is maintained without generating a clearance between the guide protrusion 55 of the seal ring 50 and the guide trench 65 of the slide ring 60, it is possible to reliably prevent a foreign object such as mud from invading the gear chamber 9. In addition, it is possible to suppress a leakage of the lubricant in the gear chamber 9 to the outside.

Figure 7:
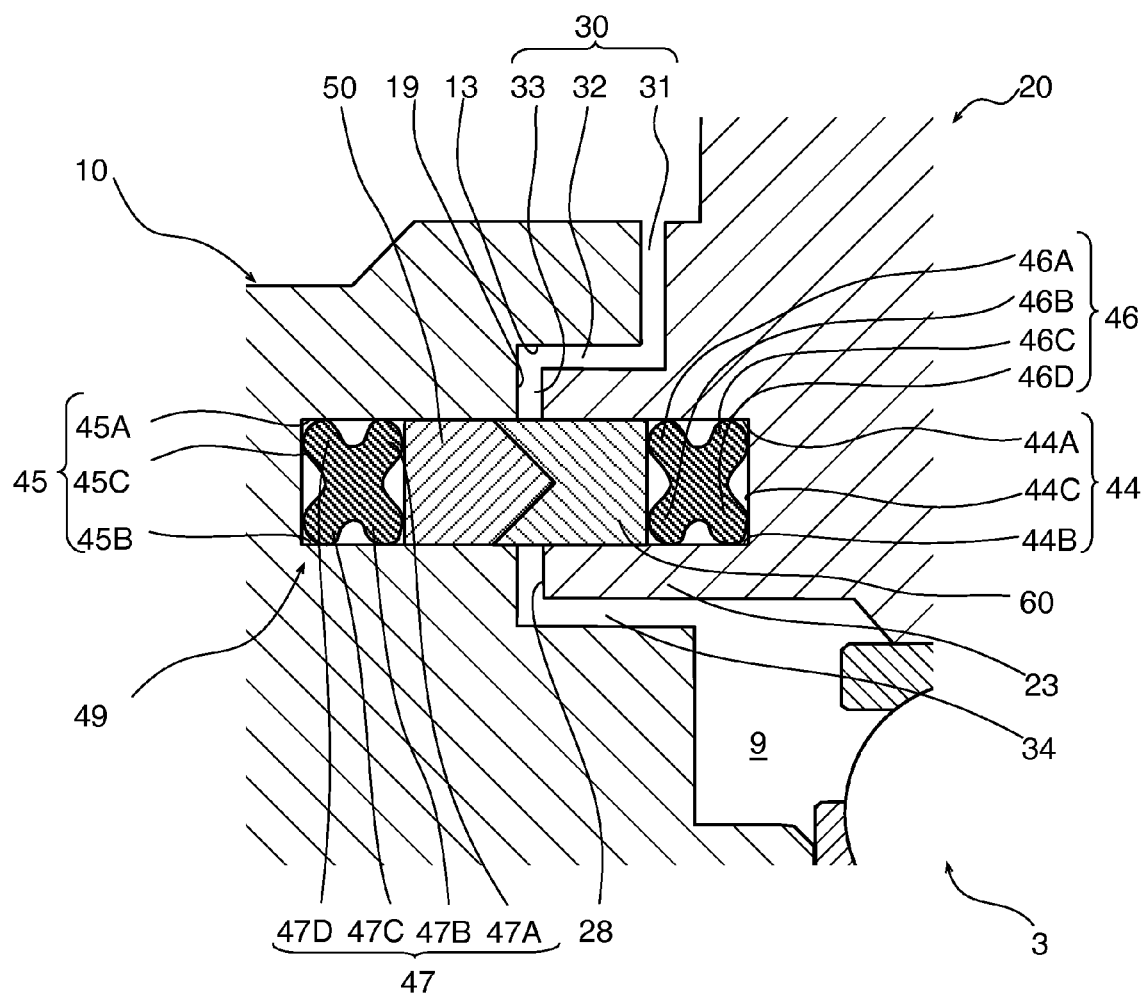
FIG. 7 is similar to FIG. 2 but showing a sixth embodiment of the invention.

Referring to FIG. 7, a sixth embodiment of the invention will be described.

According to this embodiment, the first X-ring 47 of the second embodiment is employed instead of the first O-ring 42, and the second X-ring 46 of the second embodiment is employed instead of the second O-ring 41, compared to the fifth embodiment. The other configurations are similar to those of the fifth embodiment.

According to this embodiment, it is possible to obtain the effect of the second embodiment described in the effect (5) in addition to the effects of the fifth embodiment.

The contents of Tokugan 2012-81617, Tokugan 2012-80968, and Tokugan 2012-81547, with a filing date of Mar. 30, 2012, in Japan, are hereby incorporated by reference.

Although the invention has been described above with reference to certain embodiments, the invention is not limited to the embodiments described above. Modifications and variations of the embodiments described above will occur to those skilled in the art, within the scope of the claims.

INDUSTRIAL FIELD OF APPLICATION

The seal structure of the crawler-driving apparatus according to this invention brings about preferable effects when it is applied to a construction machine such as a hydraulic shovel or other vehicles that travel using crawlers.

What is claimed is:

1. A seal structure of a crawler-driving apparatus, arranged between a rotational casing that drives a crawler of a crawler vehicle and a fixed housing fixed to a vehicle body of the crawler vehicle, comprising:
   a first annular holding groove formed in one of the rotational casing and the fixed housing;
   a second annular holding groove formed in another one of the rotational casing and the fixed housing to face the first holding groove;
   a seal ring held in the first holding groove;
   a slide ring that is held in the second holding groove and has a higher rigidity than that of the seal ring;
   a first elastic member held in the first holding groove to bias the seal ring towards the slide ring; and
   a second elastic member held in the second holding groove to bias the slide ring towards the seal ring,
   wherein
   the slide ring has a conical slide surface inclined with respect to a rotation axis of the rotational casing,
   the seal ring has a conical sealing portion that makes sliding contact with the slide surface,
   the first holding groove has a first outer circumferential groove side surface and a first inner circumferential groove side surface extending in a direction of the rotation axis of the rotational casing,
   the second holding groove has a second outer circumferential groove side surface and a second inner circumferential groove side surface extending in the direction of the rotation axis of the rotational casing,
   the seal ring is in contact with the first inner circumferential groove side surface, and is out of contact with the first outer circumferential groove side surface, and
   the slide ring is in contact with the first outer circumferential groove side surface, and is out of contact with the second inner circumferential groove side surface.

2. The seal structure according to claim 1, wherein the slide ring abuts on the first outer circumferential groove side surface while having a gap with the first inner circumferential groove side surface.

3. The seal structure according to claim 1, wherein the seal ring is made of a resin, and the slide ring is made of a metal.

4. The seal structure according to claim 1, wherein the seal ring is made of a resin, and the slide ring is made of a resin having a lower friction than a friction of the seal ring.

5. The seal structure according to claim 1, wherein both the first and second elastic members are rings having an X-shaped cross section.

6. The seal structure according to claim 1, wherein
   a radial width of the second holding groove is larger than a radial width of the first holding groove, and
   the slide ring is arranged with a gap with respect to both the second outer circumferential groove side surface and the second inner circumferential groove side surface.

7. The seal structure according to claim 6, wherein the slide ring is arranged to make sliding contact with the first outer circumferential groove side surface of the first holding groove.

8. The seal structure according to claim 6, wherein both the first and second elastic members are rings having an X-shaped cross section.

9. The seal structure according to claim 1, wherein
   one of the rotational casing and the fixed housing has an annular convex portion that protrudes into another one of the rotational casing and the fixed housing, has an end face, and is formed concentrically with a rotation axis of the rotational casing,
   the other one of the rotational casing and the fixed housing has an annular concave portion having a bottom surface to receive the annular convex portion,
   the first holding groove has an opening in the bottom surface of the annular concave portion,
   the second holding groove has an opening in the end face of the annular convex portion,
   a gap between the bottom surface of the annular concave portion and the end face of the annular convex portion located outward from the first and second holding grooves is communicated with an outside of the rotational casing and the fixed housing through
      a radial gap formed between the rotational casing and the fixed housing in an outer circumference of the annular convex portion, and
      an axial gap formed between the rotational casing and the fixed housing at an end of the radial gap,
   a gap between the end face of the annular convex portion and the bottom surface of the annular concave portion located inward from the first and second holding grooves is communicated with a gear chamber through a radial gap formed between the rotational casing and fixed housing in an inner circumference of the annular convex portion, and
   the gear chamber is filled with lubricant and formed in the rotational casing.

* * * * *